US008621591B2

(12) United States Patent  
Sobel et al.

(10) Patent No.: US 8,621,591 B2  
(45) Date of Patent: Dec. 31, 2013

(54) SOFTWARE SIGNING CERTIFICATE REPUTATION MODEL

(75) Inventors: William E. Sobel, Stevenson Ranch, CA (US); Bruce E. McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 236 days.

(21) Appl. No.: 12/907,308

(22) Filed: Oct. 19, 2010

(65) Prior Publication Data

US 2012/0096516 A1 Apr. 19, 2012

(51) Int. Cl.  
*H04L 29/00* (2006.01)

(52) U.S. Cl.  
USPC .............. 726/9; 726/2; 713/156; 713/176

(58) Field of Classification Search  
USPC ...................... 726/2; 713/156, 176  
See application file for complete search history.

(56) References Cited

U.S. PATENT DOCUMENTS

2007/0074033 A1* 3/2007 Adams et al. .............. 713/176  
2009/0228704 A1* 9/2009 de Atley et al. ............ 713/156  
2009/0249071 A1 10/2009 De Atley et al.

OTHER PUBLICATIONS

PCT International Search Report and Written Opinion, PCT Application No. PCT/US2011/053881, Dec. 23, 2011, 8 pages.  
PCT Written Opinion, PCT Application No. PCT/US2011/053881, Oct. 4, 2012, 5 pages.

* cited by examiner

*Primary Examiner* — Jeffrey Pwu  
*Assistant Examiner* — Michael D Anderson  
(74) *Attorney, Agent, or Firm* — Fenwick & West LLP

(57) ABSTRACT

A request from a software developer is received to digitally sign software included in the request. A security policy associated with the software developer is accessed where the security policy describes criteria for valid request by the software developer. A determination is made whether the request is valid based at least in part on the security policy. The software is digitally signed responsive to the determination indicating that the request is valid. The digitally signed software is provided to the software developer.

20 Claims, 4 Drawing Sheets

SOFTWARE SIGNING CERTIFICATE REPUTATION MODEL

BACKGROUND OF THE INVENTION

1. Field of the Invention

This invention pertains in general to computer security and in particular to preventing malicious and/or unauthorized code (i.e., malware) from executing on a computer system through code signing by a certificate authority.

2. Description of the Related Art

A parasitic computer virus typically infects a computer system by inserting viral code into other executable programs stored on the computer system. This code can infect other files and/or computer systems, destroy data on the computer system, or perform other malicious actions. Other types of malicious code, including Trojan horses, worms, keystroke grabbers, etc. can also damage computer systems. Thus, there is a strong desire to prevent viruses and other malicious code from infecting and/or executing on a computer system.

One technique for preventing attacks is to establish mechanisms for detecting whether software has been altered by a virus or other malicious code. Code signing is one technique for detecting alterations. Digitally signed code includes values in computer programs that the computer system can use to detect whether the code has been altered. Code signing thus prevents tampering with executable content.

In conventional systems, a software developer obtains signing keys and a corresponding digital certificate from a certificate authority (CA) in order to sign code. The digital certificate may be used by the software developer until the certificate expires. At that time, the certificate must be renewed by the certificate authority that issued the certificate. However, during the period of time in which the certificate is valid, the software developer need not further interact with the certificate authority. Thus, the usage of the signing keys is unknown to the certificate authority.

Malware authors have begun stealing code signing certificates from legitimate software companies as well as registering certificates under numerous false business names. Because the certificate authority is not aware of the usage of the digital certificates, the malware authors are able to use the legitimate certificates to digitally sign malware. By digitally signing malware, anti-malware systems are circumvented because these systems often give higher trust to signed software and assume that the signed code is non-malicious.

Accordingly, there is a need to address problems created by stolen and/or misused digital certificates.

BRIEF SUMMARY

The above and other needs are met by a computer-implemented method, a computer system, and a non-transitory computer-readable storage medium storing executable code for using a computer system of a certificate authority to digitally sign software. One embodiment of the computer-implemented method comprises receiving a request from a software developer to digitally sign software included in the request. A security policy associated with the software developer is accessed. The security policy describes criteria for valid requests by the software developer. The computer-implemented method determines whether the request is valid based at least in part on the security policy. The software is digitally signed responsive to the determination indicating that the request is valid. The computer-implemented method provides the digitally-signed software to the software developer.

Embodiments of a computer system of a certificate authority to digitally sign software comprise a computer processor and a non-transitory computer readable storage medium storing computer program modules configured to execute on the computer processor. The computer program modules comprise a signing request module configured to receive a request from a software developer to digitally sign software included in the request. The modules further comprise a request verification module configured to access a security policy associated with the software developer, the security policy describing criteria for valid requests by the software developer and determine whether the request is valid based at least in part on the security policy. Lastly, the modules comprise a software signing module is configured to digitally sign the software responsive to the determination indicating that the request is valid and provide the digitally-signed software to the software developer.

Embodiments of the computer program product comprise a non-transitory computer-readable storage medium storing computer-executable code, the code when executed by a computer processor performs steps comprising receiving a request from a software developer to digitally sign software included in the request. A security policy associated with the software developer is accessed. The security policy describes criteria for valid requests by the software developer. The steps further comprise determining whether the request is valid based at least in part on the security policy. The software is digitally signed responsive to the determination indicating that the request is valid. The steps comprise providing the digitally-signed software to the software developer.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
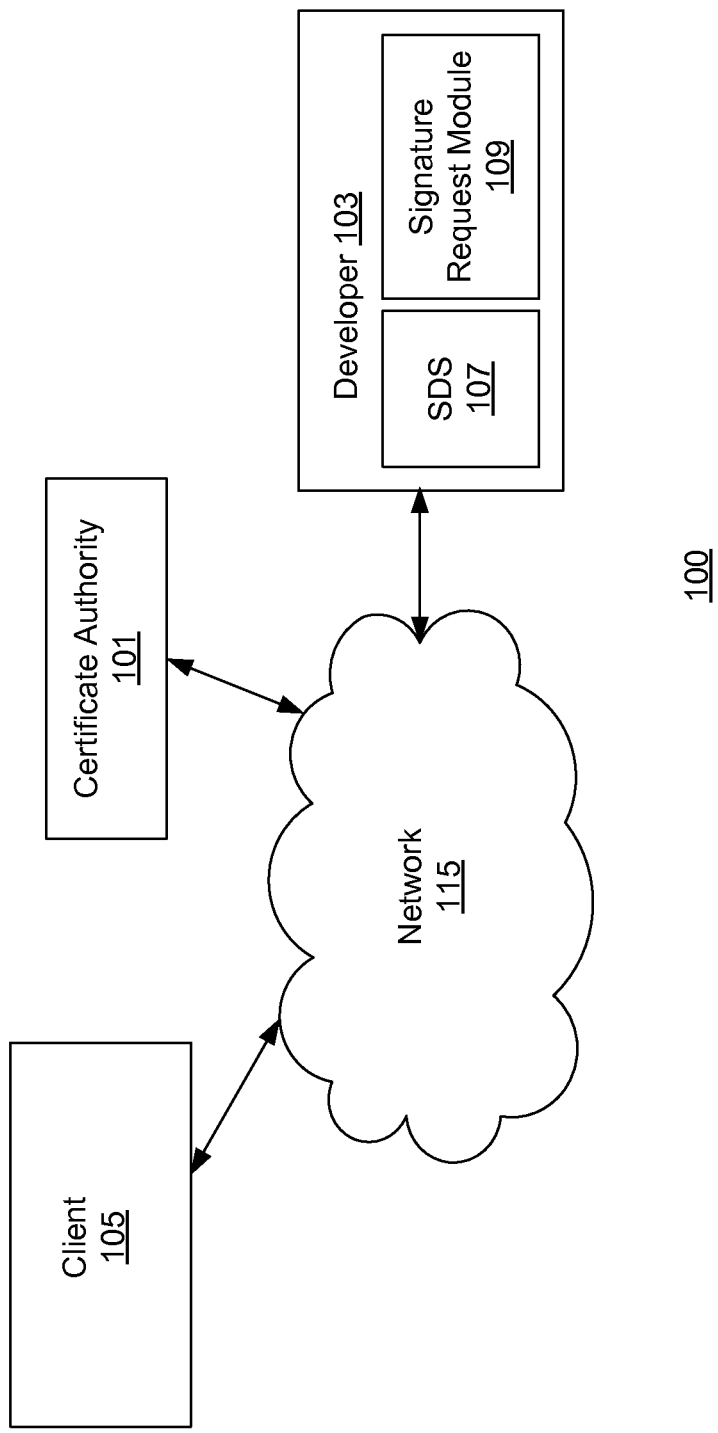
FIG. 1 is a high-level block diagram of a computing environment according to one embodiment.

FIG. 1 is a high-level diagram of a computing environment 100 according to one embodiment. FIG. 1 illustrates a certificate authority (CA) 101, a developer computer system 103, and a client 105. Only one client 105 and one developer system 103 are shown in FIG. 1 in order to simplify and clarify the description. Embodiments of the computing environment 100 can have thousands or millions of clients 105 and/or developers 103, and multiple CAs 101, connected to the network 115.

Generally, the CA 101 is an entity that issues and manages security credentials, signing keys (private/public key pairs), and/or other data in order to support authentication, verification, and encryption of computer programs (sometimes referred to as "software" or "code"). The CA 101 generates private/public key pairs using public-key-based techniques. The CA 101 issues certificates containing encrypted information that can be decrypted using the CA's public key. Since the CA's public key is well known and easily verified, parties can use the public key to verify that a certificate issued by the CA 101 is legitimate.

In one embodiment, the CA 101 issues certificates to software developers 103 that specify the developers' public keys. A software developer 103 can develop software, digitally sign it using the developer's private key (the "signing key"), and distribute the software along with the certificate issued by the CA 101 that specifies the developer's public key. A third party, such as the client 105, can use the CA's public key to decrypt the certificate and verify that the certificate was issued to the developer 103 by the CA 101 and has not been altered. In addition, the third party can use the developer's public key within the certificate to verify the developer's digital signature and detect whether the software has been altered. Therefore, the functionality provided by the CA 101 allows software to be communicated from the developer computer system 103 to the client 105 without tampering (i.e., the client 105 is able to detect any tampering).

As mentioned in the Background section, one problem with the environment described above is that software developer 103 need not interact with the CA 101 when signing software. Therefore, the developer's certificate is subject to misuse, either by the developer 103 itself or a malicious third party that obtains the developer's private key. To address this and other issues, in one embodiment, the CA 101 itself signs software received from software developers 103. Alternatively, the CA 101 may co-sign software that has been signed by the software developers 103.

As part of the signing, the CA 101 creates high trust certificates that are included with the signed software. Because the CA 101 is included in the software signing process, the CA 101 is able to monitor usage of code signing keys and issue a high trust certificate only if the CA determines that the signing request from the developer 103 is legitimate. Moreover, an embodiment of the CA 101 assesses the reputation of the developer 103 requesting signing of software, and embeds information describing the reputation in the certificate. Furthermore, in an embodiment where co-signing by the CA 101 is required, the CA can detect misuse of code signing keys by identifying software in the environment 100 that lacks the co-signature.

In one embodiment, the developer system 103 is utilized by a software developer to develop software (i.e., computer programs or code) for execution on the client 105. The developer computer system 103 includes a software development system module (referred to as the "SDS") 107 that the developer uses to develop software adapted for execution on clients 105. The SDS 107 includes functionality allowing the developer to write, compile, link, and debug executable code.

In one embodiment, the developer computer system 103 includes a signature request module 109. The signature request module 109 communicates with the CA 101 to request that the CA 101 sign (or co-sign) completed software created by the SDS 107. The user of the developer system 103 may submit software signing requests to the CA 101 via a secure web portal provided by the CA 101 or through other means including e-mail. The signature request module 109 may automatically authenticate itself with the web portal provided by the CA 101 or notify a user of the developer system 103 to manually submit a signing request to the CA 101.

Additionally, the signature request module 109 may communicate with the CA 101 to obtain signing keys and corresponding digital certificates. The signature request module 109 may sign software developed with the SDS 103 using the signing keys provided by the CA 101 or other certificate authorities. The signature request module 109 may then request for the CA 101 to co-sign the signed software in order for the CA 101 to acknowledge the usage of the signing key used by the signature request module 109 to sign the software.

In one embodiment, the signature request module 109 is integrated into SDS 107. Alternatively, the signature request module 109 is a discrete module that is called by the SDS 107 or the developer once software is produced. The signature request module 109 may be implemented as an automated process that automatically and transparently (i.e., without developer intervention) requests that the CA 101 sign all software developed with the SDS 107. This automated embodiment reduces the burden on the part of the developer to produce signed code.

Once the developer system 103 receives software that has been signed or co-signed by the CA 101, the developer system 103 may distribute the signed software to clients 105. The developer system 103 may distribute the signed software via standard distribution channels, such as by selling boxed software at retail stores and/or making the software available for download from the Internet.

In one embodiment, a client 105 is a computer used by one or more users to perform activities including downloading, installing, and/or executing software applications. The client 105, for example, can be a personal computer comprising a web browser such as MICROSOFT INTERNET EXPLORER, MOZILLA FIREFOX, APPLE SAFARI, or GOOGLE CHROME that allows the user to retrieve and display content from web servers and other computers on the network 115. In other embodiments, the client 105 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 105 can be a network gateway located between an enterprise network and the Internet.

In one embodiment, the client 105 evaluates the certificates and signatures associated with software before executing it. The client 105 determines a level of trust (i.e., trustworthiness) for the software based on the certificates/signatures, and also determines whether and how to execute the software based on the trust level. For example, in one embodiment if the software is co-signed by the CA 101 and the certificate from the CA indicates that the developer 103 has a good reputation, the client 105 executes the software without any extra precautions. The client 105 treats the CA's signature and reputation assessment as a guarantee that the software was created by a trusted software developer and, therefore, is not malicious. In one embodiment, the client 105 may refrain from executing software that is not co-signed by the CA 101. Alternatively, if the software is not co-signed by the CA 101 or the CA's certificate indicates that the developer 103 has less than a good reputation, the client 105 may execute the software with extra precautions, such as executing the software only after it is scanned for malware, or executing the software with limited privileges.

Communication between the certificate authority 101, client 105, and developer system 103 is performed via the network 115. In one embodiment, the network 115 uses standard communications technologies and/or protocols. Thus, the network 115 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 115 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 115 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 115 can also include links to other networks such as the Internet.

Figure 2:
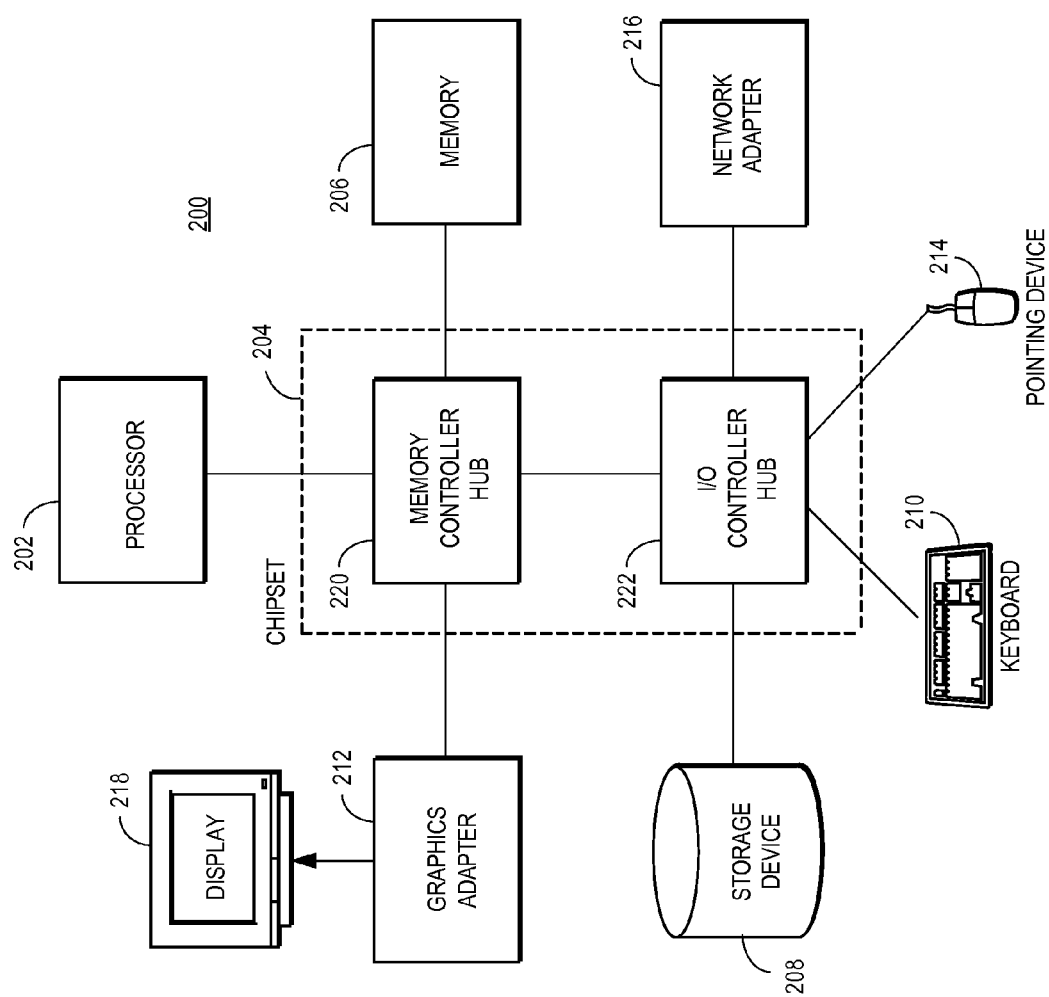
FIG. 2 is a high-level block diagram illustrating a typical computer for use as a certificate authority, a client, or software developer computer system according to one embodiment.

FIG. 2 is a high-level block diagram of a computer 200 for acting as a CA 101, a developer system 103, and/or a client 105 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a certificate authority 101 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
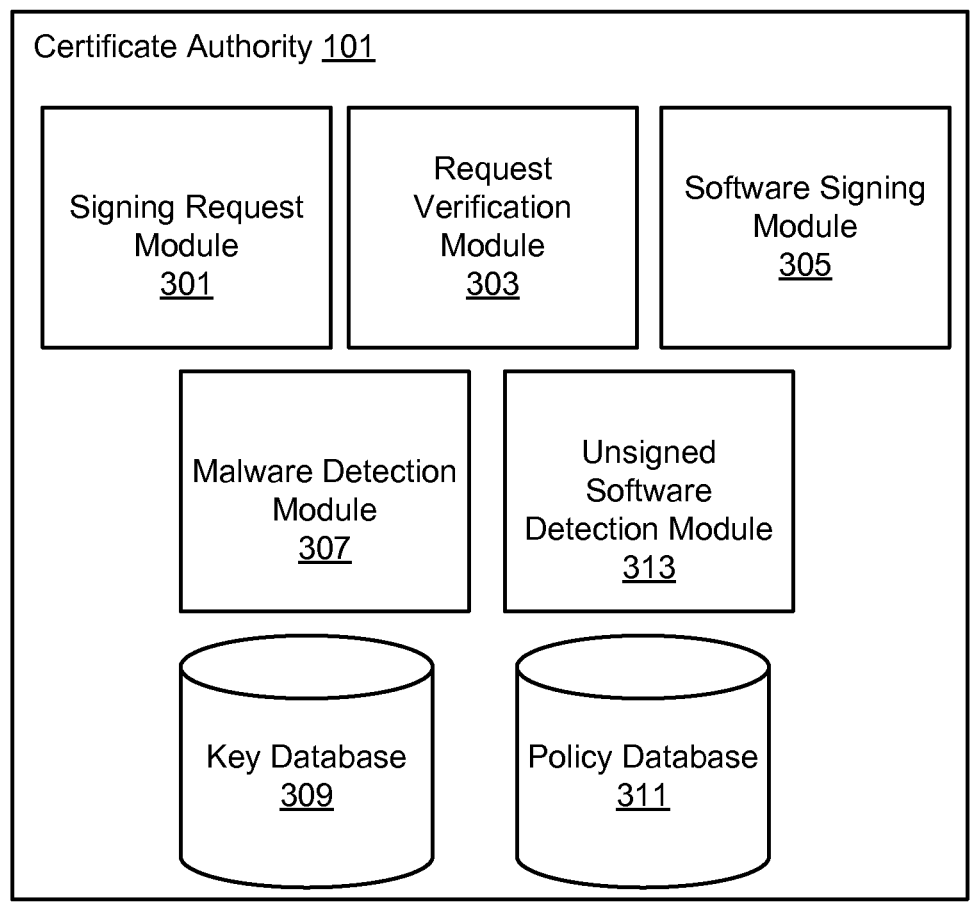
FIG. 3 is a high-level block diagram illustrating a detailed view of the certificate authority according to one embodiment.

FIG. 3 is a high-level block diagram illustrating a detailed view of the CA 101 according to one embodiment. As shown in FIG. 3, the CA 101 includes multiple modules that are in communication with one another. Those of skill in the art will recognize that other embodiments of the CA 101 can have different and/or other modules than the ones described herein, and that the functionalities can be distributed among the modules in a different manner.

In one embodiment, the key database 309 stores one or more private/public key pairs that the CA 101 uses to sign software in response to requests from software developers 103. As is known in the art, a key is a mathematical value, such as a long integer, that is usually generated according to a random or pseudo-random technique. Public-key encryption utilizes a private key/public key pair. The keys are related such that a message encrypted with the private key can be decrypted with the public key and vice versa, but the public key and message cannot be used (at least in a reasonable amount of time) to calculate the private key. The CA 101 may use conventional techniques to generate the key pairs, including, for example, techniques utilizing the Diffie-Hellman, Knapsack, DSA, and/or RSA key-generation schemes.

The policy database 311 stores security policies (i.e., profiles) for software developers 103 in communication with the CA 101. In one embodiment, a software developer's security policy describes the criteria or conditions in which the CA 101 can expect valid software signing requests from a software developer 103. A software developer 103 may provide its security policy to the CA 101 indicating default conditions or terms of valid software signing requests. The CA 101 may update the security policy of the software developer 103 based on observations of the actual (i.e., real) conditions in which the software developer 103 requests the CA 101 to sign software. The software developer 103 may also provide updated conditions of valid signing requests. Alternatively, a software developer 103 may not provide a security policy to the CA 101. By not providing a security policy, a software developer 103 lacks restrictions for software signing request directed to the CA 101. Accordingly, the CA 101 may generate the security policy for the software developer 101 based on the observations of the conditions in which the software developer 103 requests the CA 101 to sign software.

As mentioned previously, a security policy may define specific conditions that must be verified by the CA 101 to determine whether a signing request is valid or anomalous with respect to the security policy. For example, a software developer's security policy may describe machine IDs of computer systems and/or personnel (i.e., staff) associated with the software developer 103 that may submit valid software signing requests to the CA 101. The security policy may also describe geo-locations from which the CA 101 may expect signing requests from the software developer. For example, a security policy may indicate signing requests may only be received from computer systems located in the USA. The specified geo-locations may also describe more specific locations such as a city or zip code(s) from which requests must be received by the CA 101. In one embodiment, a security policy may also describe a software developer's schedule of software build dates. The build dates are indicative of time periods (e.g., days, weeks, or months) in which the CA 101 can expect to receive requests from the software developer to sign completed software. Additionally, the software developer may indicate in its policy for the CA 101 to verify that submitted software is non-malicious by analyzing the software for malicious characteristics. In other embodiments, a software developer's policy may include rules other than those described herein.

The signing request module 301 receives software signing requests from developer computer systems 103. In one embodiment, the software included in a request from a developer computer system 103 may be unsigned. Alternatively, the software included in the request may already be signed by the developer computer system 103. Thus, the software developer is requesting that the CA 101 co-sign or counter sign the software. In one embodiment, the requests are received by the signing request module 301 via a secure web portal provided by CA 101. Software developers 103 log into the secure web portal using credentials such as a user name and password. Once the credentials are verified, software developers 103 provide software signing requests that are received by the signing request module 301. Alternatively, the software signing module 301 may receive requests via other means such as e-mail.

In one embodiment, in addition to the signed/unsigned software, a signing request comprises information (e.g., metadata) that describes the conditions of the request. The signing request module 301 obtains the metadata from the request itself according to one embodiment. For example, the signing request module 301 may obtain from metadata associated with the request a machine ID of the developer computer system 103 that submitted the request and/or a date and time that the computer system 103 request was submitted. Furthermore, the signing module 301 may identify a user submitting the request from metadata indicative of a user name and/or password provided to a web portal from which the request was submitted.

Additionally, the signing request module 301 may derive the metadata from the request. The signing request module 301 may derive metadata such as geo-location information indicative of the origin of the request. To determine the geo-location information, the signing module 301 may observe the IP address from which the request was received. Furthermore, if a request to sign software was transmitted via e-mail, the signing request module 301 may identify the user submitting the request based on an e-mail address of the person that submitted the request.

In one embodiment, the signing request module 301 identifies historical patterns of software signing requests from the software developer 103. The signing request module 301 updates the software developer's security policy based at least in part on the identified patterns of requests. Thus, although the software developer system 103 may have defined initial criteria in a security policy indicative of valid signing requests, the signing request module 301 modifies the policy according to the patterns of the software developer's actual signing requests. For example, a software developer may have indicated in a security policy that valid requests originate only from California. However, the signing request module 301 may determine that valid signing requests from the software developer actually originate from California and New York based on the software developer's history of signing requests to CA 101.

In one embodiment, the request verification module 303 determines whether a received software signing request from a software developer system 103 is valid or anomalous. The request verification module 303 determines that a request is valid if the conditions of the request are consistent with the terms indicated in the security policy of a software developer 103. That is, the request verification module 303 identifies whether the conditions of the signing request match the general signing pattern of the software developer 103 as indicated by the developer's security policy. A request is anomalous if the conditions of the request are inconsistent with the security policy of the software developer. To determine whether a request is valid or anomalous, the request verification module 303 compares the information (e.g., metadata) associated with the request with the software developer's security policy stored in the policy database 311. Responsive to the comparison indicating that the conditions of the request are consistent (i.e., matches) with the software developer's security policy, the request verification module 303 determines that the request is valid.

For example, the software developer's security policy may indicate that valid requests originate from only the USA and from only a specific machine ID. The request verification module 303 compares the software developer's security policy with the metadata from the request indicating the origin of the request as well as metadata indicating the machine ID of the software developer system 103 that transmitted the request to the CA 101. From the metadata, the request verification module 303 determines the request originated from California and from a machine ID listed in the security policy of the developer. Thus, the request verification module 303 determines that the request is valid.

However, if the comparison indicates that the conditions of the request are inconsistent (i.e., do not match) with the software developer's security policy, the request verification module 303 identifies the request as anomalous. Responsive to the request being anomalous, the request verification module 303 may perform one or more security actions. In one embodiment, the security action comprises treating the anomalous request as malicious and automatically denying the signing request. Thus, the request verification module 303 refuses to sign/counter sign the software. Alternatively, the request verification module 303 may not automatically consider an anomalous request as malicious. Instead, the request verification module 303 may perform a security action comprising contacting the software developer that submitted the request. By contacting the software developer, the request verification module 303 may determine whether the request is in fact a valid request. Further, the request verification module 303 may require the software developer to provide a password to validate the request. Upon verification of the password, the request verification module 303 may consider the request as valid.

For example, responsive to the request verification module 303 determining that a request is anomalous, the request verification module may contact the software developer 103 via e-mail or telephone with a message regarding the request. The message may indicate that a request to sign software from the developer was anomalous because it did not conform with the developer's security policy. For example, the developer's security policy may indicate that valid signing request are only received from the USA, but the origin of the anomalous request is China. Thus, the request is seen as suspicious and the software developer 103 is contacted. In addition, the message may include a challenge question for the software developer such as requesting the software developer to provide a password to authenticate itself to the CA 101. The request is then determined to be valid responsive to the CA 101 receiving the correct password associated with the software developer.

The certificate authority 101 further comprises a malware detection module 307. In some embodiments, the request verification module 303 calls the malware detection module 307 to scan received software in order to determine whether a signing request is anomalous. The malware detection module 307 analyzes software included in signature requests from software developer system 103 for malicious characteristics. That is, the malware detection module 307 identifies whether the received software is or contains malware. Thus, the malware detection module 307 prevents malicious software from being signed even though the conditions of the request may comply with the software developer's security policy. Responsive to malicious software being detected by the malware detection module 307, the request associated with the malicious software is automatically denied. The malicious software may be stored by the malware detection module 307 in order to develop malware signatures based on the malware. The malware signatures are transmitted to clients 105 to update anti-virus software stored on the clients.

In one embodiment, the request verification module 303 also determines whether signing keys have been stolen. Upon receiving a request to co-sign software that is already signed, the request verification module 303 communicates with the known certificate owner (other than itself) that issued the signing keys used by the software developer system 103 to sign the software. By communicating with the certificate authority, the request verification module 303 determines whether the certificate authority is expecting usage of the signing key by the developer system 103. That is, the request verification module 303 validates that the certificate owner is expecting usage of the signing keys. By confirming that the certificate owner is expecting usage of its certificate(s), the request verification module 303 may detect if signing keys have been stolen.

Additionally, the request verification module 303 may communicate with a stakeholder to verify each signature request submitted by a developer computer system 103. In one embodiment, a stakeholder is a person or group or organization associated with the developer 103 that is affected by actions of the developer 103. The request verification module 303 contacts the stakeholder to verify that the software signing request submitted by the developer computer system 103 is legitimate. The stakeholder may verify the request by providing a credential such as a password verifying the legitimacy of the developer computer system's request. Until the request is verified, the request verification module 303 may prevent software associated with the request from being signed according to one embodiment. That is, the request verification module 303 may refrain from processing the request until the legitimacy of the request is verified by the stakeholder.

The software signing module 305 digitally signs software. The software signing module 305 only signs software associated with valid signature requests according to one embodiment. To sign, the software signing module 305 uses a hash function to compute a hash of the software. In one embodiment, the software signing module 305 uses a private key from the key database 309 to encrypt the hash. In another embodiment, the private key is utilized by the hash function itself to produce the hash, thereby eliminating the need to perform a discrete encryption of the hash.

The software signing module 305 also creates a high trust code signing certificate specifying the public key corresponding to the private key used to encrypt the hash. In one embodiment, the software signing module 305 includes reputation information in the certificate. The reputation information is indicative of the trustworthiness of the signed software and/or the reputation of the developer 103. The reputation information may include terms of a software developer's security policy that were met during the verification of the software developer's signing request and/or an indication that a stakeholder confirmed the submission of the signing request. Other indications of reputation may be included in the certificate such as a reputation score calculated by the CA 101 based on which terms of the software developer's policy were met.

In one embodiment, different levels of trustworthiness may be included in the certificate based on the reputation information. For example, the software signing module 305 may assign a certificate a level of "trustworthy" if the certificate lacks reputation information. Although the software developer's security policy is not verified, the fact that the software is signed/co-signed by the CA 101 is enough to guarantee that the software is trustworthy. Additionally, the software signing module 305 may include a level of "very trustworthy" in a certificate if the conditions of the software developer's security policy as indicated in the certificate were verified by the CA 101 prior to signing the software. Lastly, the software signing module 305 may include a level of "extremely trustworthy" in a certificate if a stakeholder confirmed the legitimacy of a request as well as the CA 101 verifying the terms of the software developer's security policy which are indicated as reputation information in the certificate.

After creation of the certificate, the software signing module 305 stores the encrypted hash and the certificate. By storing the encrypted hash and the certificate, the software signing module 305 effectively signs the software. The software signing module 305 may send the encrypted hash and the certificate to the software developer computer system 103 to include with the software for distribution.

In one embodiment, the CA 101 further comprises an unsigned software detection module 313. The unsigned software detection module 313 identifies signed software in environment 100 that has not been signed/co-signed by CA 101. As previously discussed, clients 105 may only execute software that is signed/co-signed by CA 101. The unsigned software detection module 313 may receive communications from clients 105 indicating unsigned software that is refused for execution. Alternatively, the unsigned software detection module 313 may receive from other external sources indications of unsigned software in environment 100.

Figure 4:
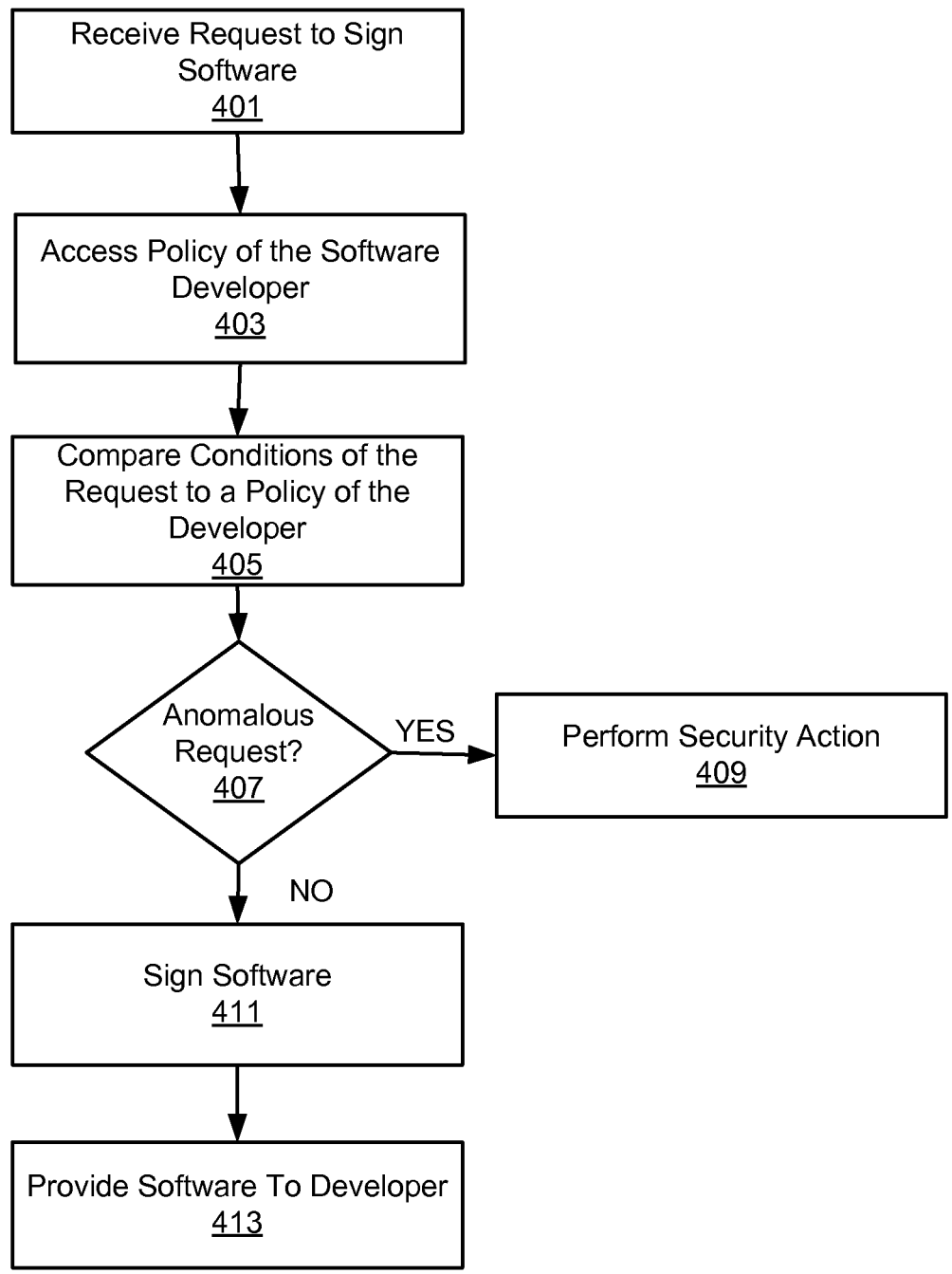
FIG. 4 is a flowchart illustrating steps performed by the certificate authority to sign software according to one embodiment.

FIG. 4 is a flowchart illustrating steps performed by the CA 101 to sign software included in signing requests from software developers according to one embodiment. Other embodiments perform the illustrated steps in different orders, and/or perform different or additional steps. Moreover, some of the steps can be performed by entities other than the certificate authority 101.

In one embodiment, the CA 101 receives 401 a request to sign software from a software developer. The CA 101 accesses 403 a security policy of the software developer that submitted the request. The CA 101 compares 405 the conditions of the request to the security policy of the software developer. The CA 101 determines 407 whether the request is anomalous based on whether the conditions of the request are consistent with the software developer's security policy. If the conditions of the request are inconsistent with the security policy, the request is anomalous and the CA 101 performs 409 a security action. The security action may comprise denying the request or contacting the software developer regarding the anomalous request. Responsive to the request being valid, the CA 101 signs 411 the software. The CA 101 provides 413 the signed software back to the software developer to fulfill the request.

Once the software developer receives the signed/co-signed software from CA 101, the software developer distributes the signed software to clients 105. The clients 105 evaluate the certificates and signatures associated with the software prior to executing it. The clients 105 may determine a level of trustworthiness for the software based on the reputation information included in the certificates. Based on the level of trustworthiness, clients 105 determine whether and how to execute the software based on the trust level. For example, a level of "extremely trustworthy" may indicate to clients 105 that the software is created by a trusted software developer and is not malicious. Thus, clients 105 may execute the software without any precautions.

The above description is included to illustrate to a certificate authority 101 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method for using a computer system of a certificate authority to digitally sign software, the method comprising:
   receiving a request from a software developer to digitally sign software included in the request;
   accessing a security policy associated with the software developer, the security policy describing criteria for valid requests by the software developer;
   determining whether the request is valid based at least in part on whether one or more of the criteria for valid requests is met;
   using the computer system to digitally sign the software responsive to the determination indicating that the request is valid;
   embedding reputation information associated with the digitally-signed software in a digital certificate, the reputation information indicative of which of the one or more criteria for valid requests that were met in the determination of whether the request is valid, the one or more criteria for valid requests comprising geo-locations from which valid requests are issued by the software developer; and
   providing the digitally-signed software and the digital certificate to the software developer.

2. The computer-implemented method of claim 1, wherein receiving the request from the software developer comprises:
   receiving a request to digitally co-sign software that is already digitally signed by the software developer.

3. The computer-implemented method of claim 1, wherein determining whether the request is valid comprises:
   identifying conditions in which the request is received from the software developer;
   comparing the identified conditions to the criteria for valid requests described by the security policy of the software developer;
   determining whether the identified conditions of the request match the criteria for valid requests described by the security policy based on the comparison;
   responsive to the identified conditions of the request matching the criteria for the valid requests, determining that the request is valid and digitally signing the software; and
   responsive to the identified conditions of the request not matching the criteria for the valid requests, determining that the request is anomalous.

4. The computer-implemented method of claim 3, further comprising:
   performing a security action responsive to determining that the request is anomalous, wherein the security action comprises denying the request.

5. The computer-implemented method of claim 3, further comprising:
   performing a security action responsive to determining that the request is anomalous, wherein the security action comprises contacting the software developer to confirm that the request is valid; and
   wherein the confirmation comprises receiving a security credential from the software developer.

6. The computer-implemented method of claim 1, further comprising:
   responsive to receiving the request, contacting a stakeholder associated with the software developer to verify that the request is valid; and
   refraining from processing the request until a security credential from the stakeholder is received verifying that the request is valid.

7. The computer-implemented method of claim 2, further comprising:
   responsive to receiving the request to digitally co-sign the software, contacting a certificate authority to verify whether usage of a signing key by the software developer to digitally sign the software is expected, the signing key provided by the certificate authority; and
   responsive to determining that the usage of the signing key is unexpected, determining that the signing key is stolen.

8. The computer-implemented method of claim 1, wherein the criteria for valid requests by the software developer further comprise at least one of a specific machine identifier that submits valid requests, identifiers of personnel associated with the software developer that issue valid requests, and a time period in which the software developer may issue valid requests.

9. A computer program product comprising a non-transitory computer-readable storage medium storing computer-executable code, the code when executed by a computer processor performs steps comprising:
   receiving a request from a software developer to digitally sign software included in the request;
   accessing a security policy associated with the software developer, the security policy describing criteria for valid requests by the software developer;
   determining whether the request is valid based at least in part on whether one or more of the criteria for valid requests is met;
   digitally signing the software responsive to the determination indicating that the request is valid;
   embedding reputation information associated with the digitally-signed software in a digital certificate, the reputation information indicative of which of the one or more criteria for valid requests that were met in the determination of whether the request is valid, the one or more criteria for valid requests comprising geo-locations from which valid requests are issued by the software developer; and
   providing the digitally-signed software and the digital certificate to the software developer.

10. The computer program product of claim 9, wherein the code when executed by the processor further performs steps comprising:
    identifying conditions in which the request is received from the software developer;
    comparing the identified conditions to the criteria for valid requests described by the security policy of the software developer;
    determining whether the identified conditions of the request match the criteria for valid requests described by the security policy based on the comparison;
    responsive to the identified conditions of the request matching the criteria for the valid requests, determining that the request is valid and digitally signing the software; and responsive to the identified conditions of the request not matching the criteria for the valid requests, determining that the request is anomalous.

11. The computer program product of claim 10, wherein the code when executed by the processor further performs steps comprising:
performing a security action responsive to determining that the request is anomalous, wherein the security action comprises denying the request.

12. The computer program product of claim 10, wherein the code when executed by the processor further performs steps comprising:
performing a security action responsive to determining that the request is anomalous, wherein the security action comprises contacting the software developer to confirm that the request is valid; and
wherein the confirmation comprises receiving a security credential from the software developer.

13. The computer program product of claim 9, wherein the code when executed by the processor further performs steps comprising:
responsive to receiving the request, contacting a stakeholder associated with the software developer to verify that the request is valid; and
refraining from processing the request until a security credential from the stakeholder is received verifying that the request is valid.

14. A computer system of a certificate authority for digitally signing software, the system comprising:
a computer processor; and
a non-transitory computer readable storage medium storing computer code configured to execute on the computer processor, the computer code when executed performs steps comprising:
receiving a request from a software developer to digitally sign software included in the request;
accessing a security policy associated with the software developer, the security policy describing criteria for valid requests by the software developer;
determining whether the request is valid based at least in part on whether one or more of the criteria for valid requests is met;
digitally signing the software responsive to the determination indicating that the request is valid;
embedding reputation information associated with the digitally-signed software in a digital certificate, the reputation information indicative of which of the one or more criteria for valid requests that were met in the determination of whether the request is valid, the one or more criteria for valid requests comprising geo-locations from which valid requests are issued by the software developer; and
providing the digitally-signed software and the digital certificate to the software developer.

15. The computer-system of claim 14, wherein the computer code when executed performs further steps comprising:
identifying conditions in which the request is received from the software developer;
comparing the identified conditions to the criteria for valid requests described by the security policy of the software developer;
determining whether the identified conditions of the request match the criteria for valid requests described by the security policy based on the comparison;
responsive to the identified conditions of the request matching the criteria for the valid requests, determining that the request is valid and digitally signing the software; and
responsive to the identified conditions of the request not matching the criteria for the valid requests, determining that the request is anomalous.

16. The computer system of claim 15, wherein the computer code when executed performs further steps comprising:
performing a security action responsive to determining that the request is anomalous, wherein the security action comprises contacting the software developer to confirm that the request is valid; and
wherein the confirmation comprises receiving a security credential from the software developer.

17. The computer system of claim 15, wherein the computer code when executed performs further steps comprising:
responsive to receiving the request, contacting a stakeholder associated with the software developer to verify that the request is valid; and
refraining from processing the request until a security credential from the stakeholder is received verifying that the request is valid.

18. The computer-implemented method of claim 1, wherein the reputation information embedded in the digital certificate indicates a level of trustworthiness of the digitally signed software.

19. The computer-implemented method of claim 18, wherein an execution of the digitally-signed software by a client device is based at least in part on the reputation information embedded in the digital certificate.

20. The computer-implemented method of claim 1, wherein the reputation information embedded in the digital certificate specifies at least one condition in which the request is received from the software developer that matches one of the criteria for valid requests by the software developer.

* * * * *